United States Patent
Allen et al.

(10) Patent No.: US 10,417,313 B2
(45) Date of Patent: Sep. 17, 2019

(54) INSERTING LINKS THAT AID ACTION COMPLETION

(71) Applicant: International Business Machines Corporation, Armonk, NY (US)

(72) Inventors: Corville O. Allen, Morrisville, NC (US); Andrew R. Freed, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 721 days.

(21) Appl. No.: 14/627,059

(22) Filed: Feb. 20, 2015

(65) Prior Publication Data

US 2016/0253294 A1  Sep. 1, 2016

(51) Int. Cl.
G06F 17/22  (2006.01)
G06F 17/27  (2006.01)

(52) U.S. Cl.
CPC ...... *G06F 17/2235* (2013.01); *G06F 17/2247* (2013.01); *G06F 17/2775* (2013.01); *G06F 17/2785* (2013.01)

(58) Field of Classification Search
CPC ..................................................... G06F 17/28
See application file for complete search history.

(56) References Cited

U.S. PATENT DOCUMENTS

| | | | |
|---|---|---|---|
| 6,393,428 B1 * | 5/2002 | Miller et al. ............ | G06F 7/00 |
| 6,778,979 B2 | 8/2004 | Grefenstette et al. | |
| 7,003,719 B1 | 2/2006 | Rosenoff et al. | |
| 7,027,975 B1 * | 4/2006 | Pazandak et al. ...... | G10F 17/27 |
| 8,594,996 B2 | 11/2013 | Liang et al. | |
| 8,700,604 B2 | 4/2014 | Roseman et al. | |
| 8,806,325 B2 * | 8/2014 | Decker ............. | G06F 17/30902 |
| | | | 345/543 |
| 9,110,977 B1 * | 8/2015 | Pierre | |
| 2002/0069223 A1 * | 6/2002 | Goodisman ....... | G06F 17/30867 |
| | | | 715/201 |
| 2005/0131892 A1 * | 6/2005 | Knott et al. ............ | G06F 17/30 |
| 2009/0094137 A1 * | 4/2009 | Toppenberg ...... | G06F 17/30861 |
| | | | 705/26.1 |
| 2011/0112921 A1 * | 5/2011 | Kennewick ........ | G06Q 30/0601 |
| | | | 705/26.1 |
| 2013/0054371 A1 * | 2/2013 | Mason ................... | G06Q 30/02 |
| | | | 705/14.64 |
| 2014/0006926 A1 | 1/2014 | Yeluri et al. | |

(Continued)

OTHER PUBLICATIONS

Dalton et al., "A Neighborhood Relevance Model for Entity Linking," OAIR'13, May 22-24, 2013, Lisbon, Portugal. Copyright 2013 CID 978-2-905450-09-8.

(Continued)

*Primary Examiner* — James J Debrow
(74) *Attorney, Agent, or Firm* — Nicholas D. Bowman

(57) ABSTRACT

Based on natural language processing of a passage of a first electronic document, a determination is made that the passage indicates an action to be undertaken. In response to this determination and based on an analysis of a second electronic document, the second electronic document is identified as incorporating content preconfigured to allow completion of the action. In response to this identification, the passage is linked to the second electronic document.

4 Claims, 5 Drawing Sheets

(56) References Cited

U.S. PATENT DOCUMENTS

| | | | | |
|---|---|---|---|---|
| 2014/0164352 A1* | 6/2014 | Denninghoff | ...... | H03H 9/02622 707/711 |
| 2014/0258261 A1* | 9/2014 | Singh | ................ | G06F 17/30887 707/709 |
| 2014/0343921 A1* | 11/2014 | Fink | ........................ | G06F 17/27 704/9 |
| 2015/0324422 A1* | 11/2015 | Elder | ................ | G06F 17/30401 707/722 |
| 2015/0356127 A1* | 12/2015 | Pierre | ............... | G06F 17/30663 707/706 |

OTHER PUBLICATIONS

Drupal, "Link Intelligence," https://www.drupal.org/project/linkintel (last accessed Dec. 29, 2014 11:55 AM).

Wikipedia, "Hyperlink," http://en.wikipedia.org/wiki/Hyperlink (last modified Jan. 27, 2015 at 01:41; last accessed Feb. 4, 2015 12:21 P).

\* cited by examiner

INSERTING LINKS THAT AID ACTION COMPLETION

BACKGROUND

The present disclosure relates to natural language processing and, more specifically, to using natural language processing in identifying links that aid action completion.

Within the World Wide Web are billions of linked electronic documents. Each of these documents has a unique identifier known as uniform resource locators (URL) that serves as an address for that document. When one of these documents is related to another of these documents, it may be helpful to link the first document to the second document. One common way to do this is by adding a hyperlink in the first document. Using the URL of the second document, the hyperlink allows a reader of the first document (or other user of the first document, such as a web crawler or a computer system) to obtain access to the second document by selectably clicking on the section of the first document that contains the hyperlink.

SUMMARY

According to embodiments of the present disclosure, aspects of the disclosure may include a method, a system, and a computer program product. Based on natural language processing of a passage of a first electronic document, a determination is made that the passage indicates an action to be undertaken. In response to this determination and based on an analysis of a second electronic document, the second electronic document is identified as incorporating content preconfigured to allow completion of the action. In response to this identification, the passage is linked to the second electronic document.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of some embodiments and do not limit the disclosure.

Figure 1:
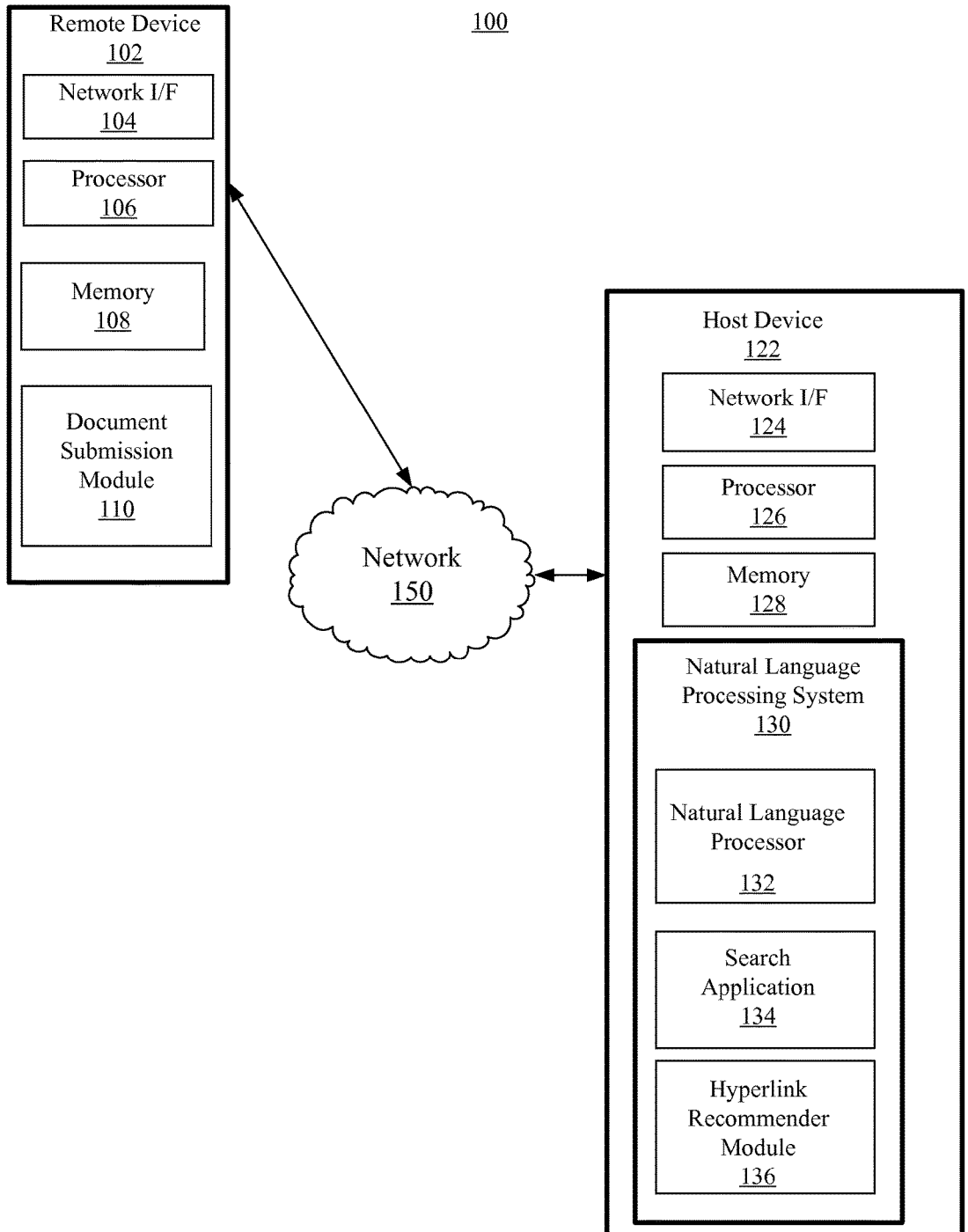
FIG. 1 illustrates a block diagram of an example computing environment for use with a natural language processing system, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to natural language processing and, more specifically, to using natural language processing in identifying links that aid action completion.

As a content developer adds text to a source document (e.g., webpage or other hypertext page or electronic document), he may wish to include one or more links that associate this text with one more target documents (e.g., other webpages that have related content). In particular, this may be desirable in situations where the text includes a request, command, or suggestion that a reader of the text (e.g., target audience, intended human user) complete some particular action. By linking this text to a target document that is preconfigured to allow completion of the particular action by the reader, the usefulness of the source document and the target document may both be increased. In some situations, however, a content developer may not have the time or desire to manually locate appropriate target documents. Further, a content developer may, on occasion, add links to improper or inadequate target documents. As a result, the source document may be missing key links that would increase its usability.

To remedy these errors or oversights, missing hyperlinks may be recommended or added using one or more computer modules. In some situations, missing hyperlinks may be created simply by linking a keyword in a source document to a target document that is the top search result in a title-oriented document search based on that keyword. This may be an unacceptable solution, however, as such a search may not take into consideration the context of the keyword in the source document or the context of the target document. In addition, such a solution may allow no way of confirming whether the target document includes content preconfigured to allow the reader to complete an action indicated in the source document.

In some embodiments of the present disclosure, missing links in a source document may be identified by finding a reader action indicated in a source document, finding a relevant target document that is preconfigured to allow the reader to complete the action, and then linking the source document to the target document. Natural language processing may be used to analyze the source document and the target document in order to determine the identity of the action to be completed, and the context of both documents. In some embodiments, the contexts of the source and target documents may be compared in order to determine whether they are related. Further, in some embodiments, the source code of the target document may be analyzed in order to determine whether it is capable of performing the action type of the identified action.

In some embodiments, a source document may be parsed and certain natural language processing techniques may be used to identify entities, phrases, and action/command statements in the source document that are related to external sources or references (e.g., potential target documents). Potential target documents may likewise be analyzed and entity resolution and context analysis may be used for determining which target document is the most relevant to a particular action identified in the source document. In some embodiments, only the most significant or relevant entities within a source document may be used in identifying and evaluating potential target documents. This may potentially allow for more targeted and accurate identifications of acceptable target documents.

In some embodiments, a source document may be a webpage, an email message, a word processor document, or other electronic document. Entity detection may be performed on the source document in order to identify the significant entities (e.g., text elements) in passages of the source document. For each entity, the context of the entity may be determined using natural language processing. A link to a target document may be chosen for an entity after analyzing a set of possible target documents that match the context of the entity and are able to aid a reader in completing an action indicated by the entity.

Actions that target documents may be preconfigured to allow readers to complete may include a wide variety of actions. For example, in some embodiments, a target document may be configured to allow a reader to download a particular file by including a download link for that particular file. Further, in some embodiments, a target document may be configured to aid a reader in an electronic submission of some form of particular written content (e.g., name, address, short answers to test questions) by including one or more imbedded fields for receiving entry of the written content as it is typed or copied and pasted by the reader.

In some embodiments, non-reader users of electronic documents may also be aided. For example, a passage of a source document may indicate an action to be completed by an application or computer system. In such a situation, some embodiments of the present disclosure may be used to identify target documents that incorporate content preconfigured to allow completion of that action by the application or computer system. A link between the source document and target document may then be established. This link may be configured to be traversed by the application or computer system, so that it can complete the action. The link may also be configured to be traversed by a web crawler. An example scenario wherein a non-reader user of an electronic document would be aided by some embodiments includes a situation in which a source webpage that includes an article about a software patch is linked to a webpage that includes a way to download the patch. In this situation, an automated application in need of the patch that discovers the source document could then navigate the link and download the patch.

As discussed above, aspects of the disclosure may relate to natural language processing. Accordingly, an understanding of the embodiments of the present invention may be aided by describing embodiments of natural language processing systems and the environments in which these systems may operate. Referring now to the figures, shown in FIG. 1 is a block diagram of an example computing environment 100 for use with a natural language processing system, in accordance with embodiments of the present disclosure. In some embodiments, the computing environment 100 may include one or more remote devices 102 and one or more host devices 122. Remote device 102 and host device 122 may be distant from each other and communicate over a network 150 in which the host device 122 comprises a central hub from which remote device 102 may establish a communication connection. Alternatively, the host device and remote device may be configured in any other suitable relationship (e.g., in a peer-to-peer or other relationship).

In some embodiments, the network 150 may be implemented by any number of any suitable communications media (e.g., wide area network (WAN), local area network (LAN), Internet, Intranet). Alternatively, remote device 102 and host device 122 may be local to each other, and communicate via any appropriate local communication medium (e.g., local area network (LAN), hardwire, wireless link, Intranet). In some embodiments, the network 150 may be implemented within a cloud computing environment, or using one or more cloud computing services. Consistent with various embodiments, a cloud computing environment may include a network-based, distributed data processing system that provides one or more cloud computing services. Further, a cloud computing environment may include any number of computers (e.g., hundreds or thousands of them or more), disposed within one or more data centers and configured to share resources over the network 150.

In some embodiments, host device 122 may include a natural language processing system 130 having a natural language processor 132, a search application 134, and a hyperlink recommender module 136. The search application 134 may be implemented by a conventional or other search engine, and may be distributed across multiple computer systems. The search application 134 may be configured to search one or more databases or other computer systems for content that is related to an electronic document submitted by a remote device 102.

In some embodiments, remote device 102 may enable users to submit (or may submit automatically with or without user input) electronic documents (e.g., source documents) to host devices 122 in order to obtain hyperlink recommendations for these documents. For example, the remote device 102 may include an electronic document submission module 110 (e.g., in the form of a web browser or any other suitable software module) and present a graphical user interface or other interface (command line prompts, menu screens, etc.) to solicit source documents from users for submission to host device 122 and to later display new versions of these source documents that include new hyperlinks incorporated based on recommendations from the host device 122.

Consistent with various embodiments, host device 122 and remote device 102 may be computer systems, and may each be equipped with a display or monitor. The computer systems may include at least one processor 106, 126; memories 108, 128; internal or external network interface or communications devices 104, 124 (e.g., modem, network interface cards); optional input devices (e.g., a keyboard, mouse, touchscreen, or other input device); and any commercially available or custom software (e.g., browser software, communications software, server software, natural language processing software, search engine and/or web crawling software, filter modules for filtering content based upon predefined criteria). In some embodiments, the computer systems may include servers, desktops, laptops, and hand-held devices.

Figure 2:
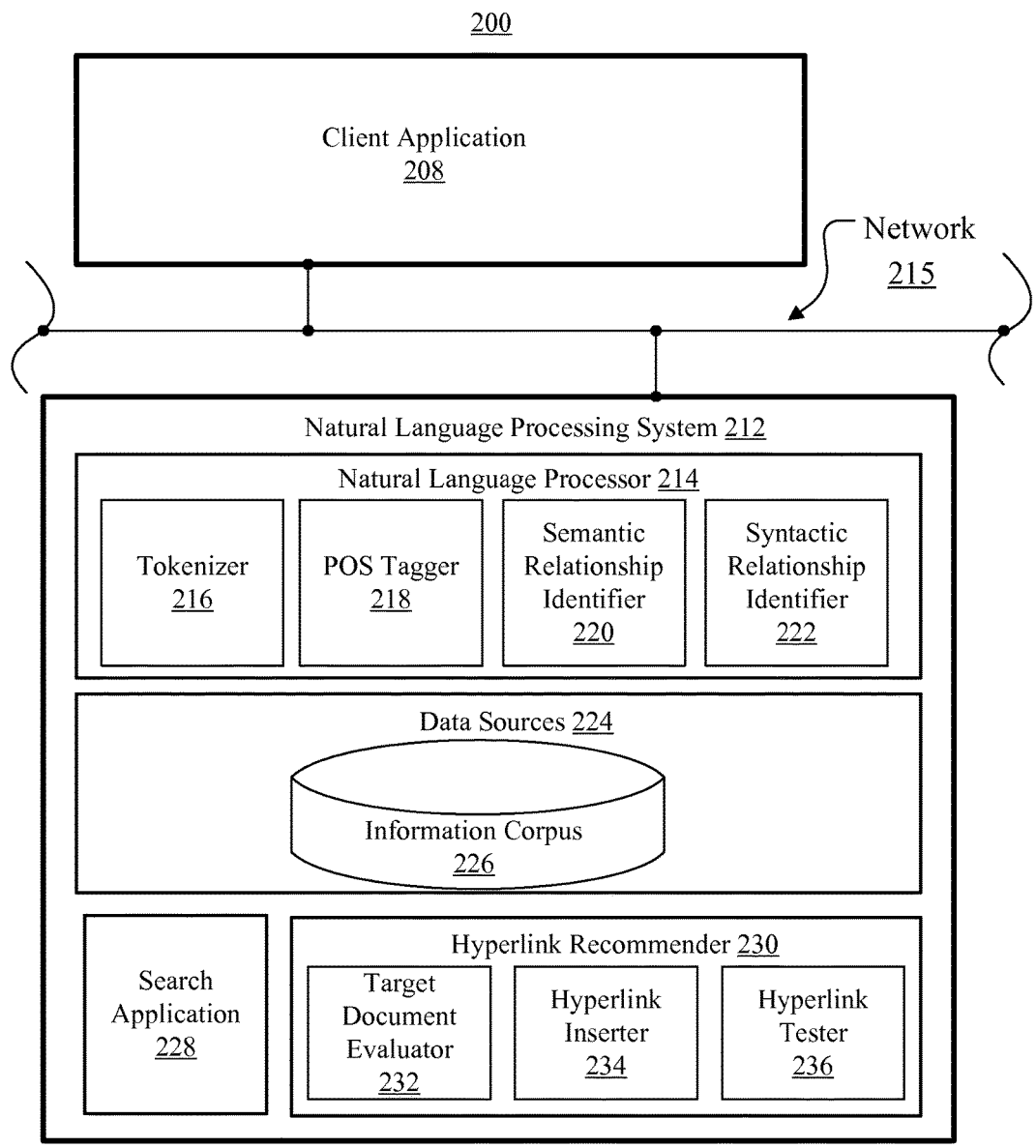
FIG. 2 illustrates a block diagram of an example natural language processing system configured to generate relevant hyperlinks for submitted electronic documents, in accordance with embodiments of the present disclosure.

Referring now to FIG. 2, shown is a block diagram of an example natural language processing system configured to generate relevant hyperlinks for submitted electronic documents, in accordance with embodiments of the present disclosure. Aspects of FIG. 2 are directed toward an exemplary system architecture 200, including a natural language processing system 212 to generate hyperlink recommendations. In some embodiments, a remote device (such as remote device 102 of FIG. 1) may submit electronic source documents to be modified to the natural language processing system 212 which may be housed on a host device (such as host device 122 of FIG. 1). Such a remote device may include a client application 208 which may itself involve one or more entities operable to generate or modify information in source documents which are then dispatched to natural language processing system 212 via network 215.

Consistent with various embodiments, natural language processing system 212 may respond to source document submissions sent by client application 208. Specifically, natural language processing system 212 may incorporate hyperlinks into the received source documents or respond with recommendations for one or more hyperlinks to incorporate into these documents. In some embodiments, natural language processing system 212 may include a natural language processor 214, data sources 224, a search application 228, and a hyperlink recommender 230. Natural language processor 214 may be a computer module that analyzes the received source documents and other electronic documents. Natural language processor 214 may perform various methods and techniques for analyzing electronic documents (syntactic analysis, semantic analysis, etc.). The natural language processor 214 may be configured to recognize and analyze any number of natural languages. In some embodiments, natural language processor 214 may parse passages of the documents. Further, natural language processor 214 may include various modules to perform analyses of electronic documents. These modules may encompass, but are not limited to, a tokenizer 216, part-of-speech (POS) tagger 218, semantic relationship identifier 220, and syntactic relationship identifier 222.

In some embodiments, tokenizer 216 may be a computer module that performs lexical analysis. Tokenizer 216 may convert a sequence of characters into a sequence of tokens. A token may be a string of characters included in an electronic document and categorized as a meaningful symbol. Further, in some embodiments, tokenizer 216 may identify word boundaries in an electronic document and break any text passages within the document into their component text elements, such as words, multiword tokens, numbers, and punctuation marks. In some embodiments, tokenizer 216 may receive a string of characters, identify the lexemes in the string, and categorize them into tokens.

Consistent with various embodiments, POS tagger 218 may be a computer module that marks up a word in passages to correspond to a particular part of speech. POS tagger 218 may read a passage or other text in natural language and assign a part of speech to each word or other token. POS tagger 218 may determine the part of speech to which a word (or other text element) corresponds based on the definition of the word and the context of the word. The context of a word may be based on its relationship with adjacent and related words in a phrase, sentence, question, or paragraph. In some embodiments, the context of a word may be dependent on one or more previously analyzed electronic documents (e.g., the content of one source document may shed light on the meaning of text elements in another source document). Examples of parts of speech that may be assigned to words include, but are not limited to, nouns, verbs, adjectives, adverbs, and the like. Examples of other part of speech categories that POS tagger 218 may assign include, but are not limited to, comparative or superlative adverbs, wh-adverbs, conjunctions, determiners, negative particles, possessive markers, prepositions, wh-pronouns, and the like. In some embodiments, POS tagger 218 may tag or otherwise annotate tokens of a passage with part of speech categories. In some embodiments, POS tagger 218 may tag tokens or words of a passage to be parsed by natural language processing system 212.

In some embodiments, semantic relationship identifier 220 may be a computer module that may identify semantic relationships of recognized text elements (e.g., words, phrases) in documents. In some embodiments, semantic relationship identifier 220 may determine functional dependencies between entities and other semantic relationships.

Consistent with various embodiments, syntactic relationship identifier 222 may be a computer module that may identify syntactic relationships in a passage composed of tokens. Syntactic relationship identifier 222 may determine the grammatical structure of sentences, for example, which groups of words are associated as phrases and which word is the subject or object of a verb. Syntactic relationship identifier 222 may conform to formal grammar.

In some embodiments, natural language processor 214 may be a computer module that may parse a document and generate corresponding data structures for one or more portions of the document. For example, in response to receiving a source document at natural language processing system 212, natural language processor 214 may output parsed text elements from the document as data structures. In some embodiments, a parsed text element may be represented in the form of a parse tree or other graph structure. To generate the parsed text element, natural language processor 214 may trigger computer modules 216-222.

In some embodiments, the output of natural language processor 214 may be used by search application 228 to perform a search of a set of (i.e., one or more) corpora to retrieve one or more candidate electronic reference documents (e.g., target documents) to link to the received source document. As used herein, a corpus may refer to one or more data sources. In some embodiments, data sources 224 may include data warehouses, information corpora, data models, and document repositories. In some embodiments, the data source 224 may include an information corpus 226. The information corpus 226 may enable data storage and retrieval. In some embodiments, the information corpus 226 may be a storage mechanism that houses a standardized, consistent, clean and integrated form of potential target documents. The data may be sourced from various operational systems. Data stored in the information corpus 226 may be structured in a way to specifically address reporting and analytic requirements. In some embodiments, the information corpus may be a relational database.

In some embodiments, hyperlink recommender 230 may be a computer module that generates recommended hyperlinks for received source documents to link them to particular target documents. In some embodiments, hyperlink recommender 230 may include target document evaluator 232, hyperlink inserter 234, and hyperlink tester 236. When one or more candidate target documents are located in a data source 224 (by search application 228 or otherwise) and are deemed to match a parsed text element from a received source document, the target document evaluator 232 may be configured to analyze and evaluate the candidate target documents. This analysis may include determining which, if any, of the potential target documents incorporate content preconfigured to allow the reader to complete an action indicated in the source document. In some embodiments, the target document evaluator 232 may use a variety of techniques including, for example, natural language processing and source code analysis in order to complete its analysis of target documents. In some embodiments, the target document evaluator 232 may utilize one or more modules 216-222 of the natural language processor 214 in order to perform this natural language processing on the potential target documents being evaluated. This natural language processing of the potential target documents done in addition to natural language processing of source documents may allow for more precise and accurate matching of source and target documents.

Based the results of the analysis by the target document evaluator 232, the hyperlink inserter 234 may insert a hyperlink in the received source document linking that document to the selected target document. The modified version of the received source document may then be returned to client application 208. In some embodiments, the hyperlink inserter 234 may not actually incorporate hyperlinks into documents, but rather may make recommendations to the client application 208 as to which hyperlinks should be added. In some embodiments, hyperlink tester 236 may be a computer module that determines whether a hyperlink is operable after insertion. In addition, the hyperlink tester 236 may also serve to test or confirm that the linked target document does include the desired preconfigured content.

Figure 3:
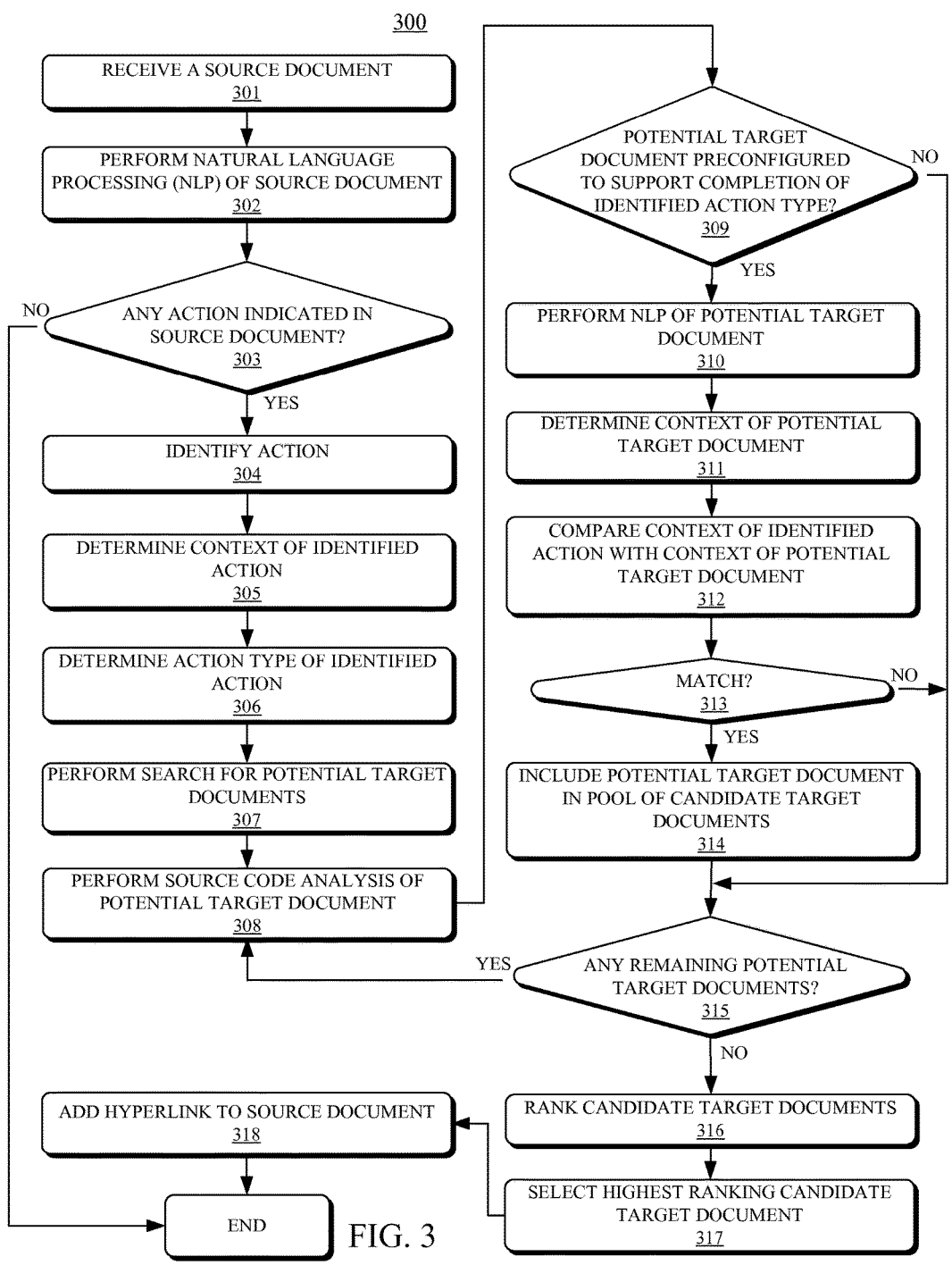
FIG. 3 illustrates a flowchart of an example method for adding a hyperlink from a source document to a target document incorporating content preconfigured to allow completion of a specified action, in accordance with embodiments of the present disclosure.

Referring now to FIG. 3, shown is a flowchart of an example method 300 for adding a hyperlink from a source document to a target document incorporating content preconfigured to allow completion of a specified action, in accordance with embodiments of the present disclosure. In some embodiments, one or more operations of the method 300 may be performed by natural language processing system 212 of FIG. 2. The method 300 may begin at operation 301 with receipt of a source document. The source document may be an electronic document, such as a webpage, that is submitted by a user or automatically identified and submitted by a computer module for annotation. As received, the source document may already incorporate one or more hyperlinks. Per operation 302, the natural language processing may be performed on the source document. The natural language processing may incorporate any relevant natural processing techniques including, without limitation, those techniques discussed in reference to modules 216-222 of FIG. 2.

Based on the results of the natural language processing, a determination may be made, per operation 303, as to whether the passages of the source document indicate that there is any action to be undertaken by the reader (e.g., the intended human recipient) of the source document or by any other potential user (e.g., a specific type of application, a web crawler). In making this determination, the system may rely on several different factors including, for example, whether the source document incorporates one or more verbs in the imperative mood and whether the source document includes one or more words that are indicative of user action (e.g. take, download, or read). If it is determined in operation 303, that there is no action indicated (or it is unlikely that there is an action indicated), then the method 300 may end without a hyperlink being added to the source document and other source documents may be analyzed. If, however, a determination is made in operation 303 that there is (or is likely to be) an action indicated in the source document, then, per operation 304, the action itself may be identified, as well as the context of the identified action (per operation 305), and the type of the identified action (per operation 306). Example action types that are identified may include, for example, reader download action type, reader field fill-in action type, and reader document electronic submission action type, and computer system automatic download action type.

When identifying the context of an identified action or other content (as described in operation 305 and elsewhere herein), the results of the natural language processing of that content may be utilized. For example, as part of natural language processing of a text passage, the passage may be parsed, and entity resolution techniques may be helpful in identifying important entities with the passage. Once entities have been identified, correlations and linguistic links between entities may be detected and used to establish relevance of the entities and, ultimately, the context of the passage. An example technique that may be useful in determining the relative importance of a given entity to the context of the passage is inverse document frequency, which utilizes the relative commonality of the entity as an indicator of its importance to evaluating context. Many other techniques may also be used.

Per operation 307, a search may be undertaken for potential target documents that could be linked to the source document by the system. In some embodiments, the search may be a preliminary search intended to obtain several potential target documents that can then be limited further to a smaller group of documents by more individualized analysis. The search may incorporate static keyword searching of the Internet using keywords (e.g., relatively important entities) obtained from the source document. Furthermore, in some embodiments, the search may utilize one or more third-party search engines.

Per operation 308, a potential target document obtained from the search may be analyzed using source code analysis. This source code analysis may incorporate parsing the HTML of the target document's source code. Based on this analysis, per operation 309, a determination may be as to whether the potential target document is preconfigured to support (e.g. allow) completion of the action type identified in operation 306. For example, if the action type is a reader download action type then the potential target document may be deemed preconfigured to support the action if it includes source code that links it to a downloadable file (e.g., a file ending in a .pdf or other applicable extension). Other evidence may also be uncovered in the analysis of the target document's source code. If, per operation 309, a determination is made that the potential target document is not preconfigured to support the identified action type, then the document may be discarded and the method may proceed to operation 315. If, however, a determination is made in operation 309 that the potential target document is preconfigured (or is likely preconfigured) to support the identified action type, then, per operation 310, natural language processing of the potential target document may be undertaken using one or more natural language processing techniques, such as those discussed elsewhere herein.

In the depicted embodiment, natural language processing of the potential target document (in operation 310) is described as occurring subsequent to determining that the potential target document is preconfigured to support the identified action type (in operation 309). This may help to preserve computing resources by helping to ensure that the only potential target documents that undergo natural language processing are those documents that are capable of being relevant. In some embodiments, however, this natural language processing may occur prior to that preconfiguration determination, and the results of the natural language processing may be used instead of or in addition to the source code analysis of operation 308. For example, in some embodiments, the discovery of certain words in the source document (e.g., download) or their semantic equivalents may be helpful in determining if the target document is preconfigured to allow completion of the identified action type.

Continuing the depicted example of method 300 and based on the results of the natural language processing of the potential target document in operation 310, the context of the potential target document may be determined, per operation 311. Next, per operation 312, the context of the identified action (as taken from the source document) may be compared with the context of the potential target document. A determination is made, per operation 313, as to whether the two have matching contexts. In some embodiments, the contexts may be deemed to match if they are substantially similar. Furthermore, in some embodiments, the contexts may be deemed to match if they achieve a threshold level of similarity. This may involve scoring factors that weigh in favor of similarity (e.g., containing semantically similar entities, similar time periods referenced, similar phraseology used, etc.) and then combining these scores and comparing them to a threshold score. If a determination is made in operation 313 that the contexts do not match (e.g., the threshold is not achieved), then the potential target document may be discarded and the method 300 may continue to operation 315. If, however, it is determined in operation 313 that the contexts do match, then, per operation 314, the potential target document may be included in a pool of candidate target documents.

In operation 315, a determination may be made as to whether there are any remaining potential target documents (uncovered in the search of operation 307) that still need to be analyzed. For each such document, operations 308-314 may be completed, as applicable. Once all of the discovered potential target documents have been analyzed, then, per operation 316, the candidate target documents in the pool of candidates may be ranked against each other. In some embodiments, this may be a ranking of how likely each document is to be the correct target document (e.g., how likely the document is to be preconfigured to allow a reader to complete the identified action). Per operation 317, the highest ranking candidate target document may be selected and, per operation 318, a hyperlink may be added to the source document in order to link it to the selected target document.

Figure 4:
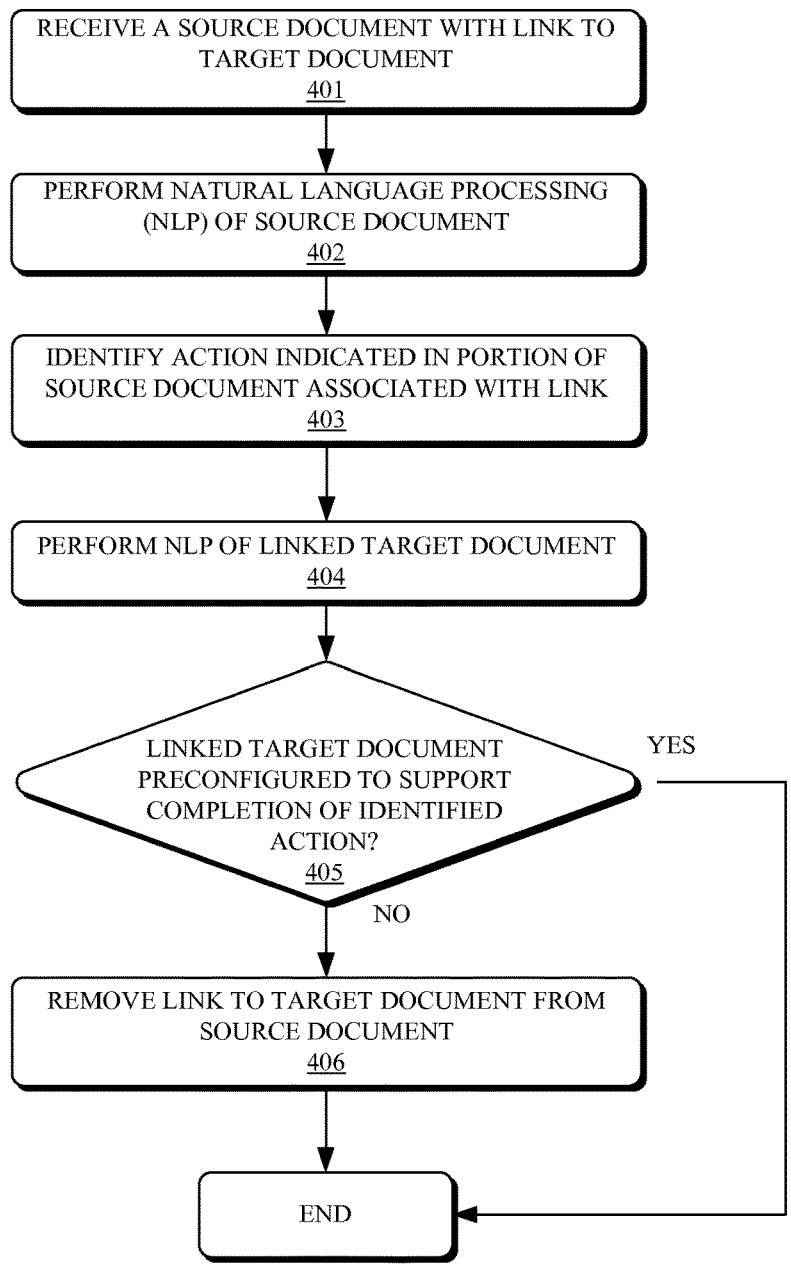
FIG. 4 illustrates a flowchart of an example method for identifying and removing improper links in a source document, in accordance with embodiments of the present disclosure.

In some situations, links to a target document may be improperly included in source documents. In some embodiments, aspects of the disclosure may be configured to remove these improper links. Referring now to FIG. 4, shown is a flowchart of an example method 400 for identifying and removing improper links in a source document, in accordance with embodiments of the present disclosure. Method 400 may begin at operation 401, with a source document being received. As received the source document includes a link (e.g., hyperlink) to a target document. Per operation 402, natural language processing may be performed on the source document. Based on this processing, an action indicated for reader (or other user) completion is identified, per operation 403, in the portion of the source document that is associated with the link. This portion may include, for example, a text element within the passage that is highlighted by a hyperlink. Per operation 404, natural language processing may be performed on the linked target document. By comparing the results of the processing of the source document (in operation 402) and the target document (in operation 404), a determination is made, per operation 405, as to whether the linked target document is preconfigured to support completion of the action identified in operation 403. If a determination is made in operation 405, that the link does support the action, then the link may remain intact and the method 400 may end. If, however, a determination is made that the linked target document is not preconfigured to support the action, then, per operation 406, the link to the target document is removed (or recommended to be removed) from the source document.

In some embodiments, the method 400 may useful for removing even relevant hyperlinks if they are otherwise improper. Specifically, in some embodiments, method 400 may be used for recommending removal of a link to a target document that includes content that is minimally relevant to the source document content but is not relevant enough (e.g., does not achieve a relevance threshold). Also, in some embodiments, method 400 may be used for recommending removal of a link to a target document that includes content that is very relevant to the source document content but is still not configured to complete an action indicated in the source document. For example, consider a scenario wherein a source document includes a request that employees of a company fill out the company's annual employee satisfaction survey. In this scenario, the source document includes a link to a target document that includes some statistics about the surveys filled out so far this year (e.g., a passage stating that over seventy percent of the employees that have already completed the survey indicated that they are happy with their jobs). In this instance, while the content of the target document is relevant to the content of the source document (because survey result statistics are relevant to surveys), the link may still be improper because the target document does not allow the reader to complete the survey as requested in the source document. In this example, one or more operations of methods 300 and 400 may be used to determine that the link to this target document is improper, to remove the improper link, to find a new target document that includes the correct content (e.g., includes a way for an employee to complete the survey), and to link the source document to this new target document.

In some embodiments, links between source documents and target documents may take many different forms. These links may include, for example, hyperlinks marked and embedded directly over the top of specific source document passages. A specific type of link may also include, for example, an inline link, an anchor link embedded in text of a passage, and an anchor link incorporating a hot area (e.g., a selected portion of an image within a source document).

Figure 5:
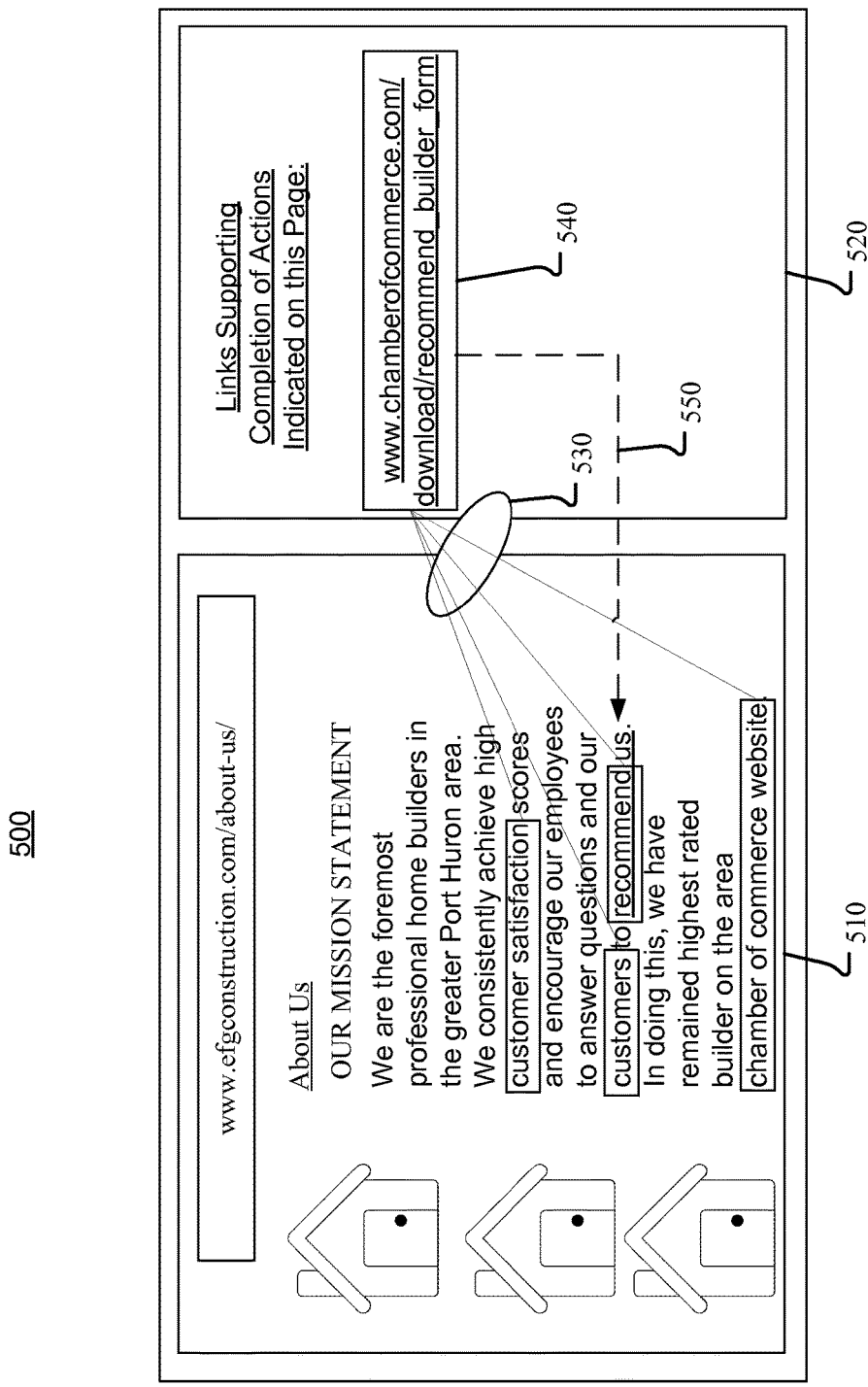
FIG. 5 illustrates a diagram of a screenshot of an example webpage and an associated action completion sidebar, in accordance with embodiments of the present disclosure.

Referring now to FIG. 5, shown is a diagram of a screenshot 500 of an example webpage 510 and an associated action completion sidebar 520, in accordance with embodiments of the present disclosure. As shown, the example webpage 510 is an "About Us page" for a fictitious building company (EFG Construction). In this example, the action completion sidebar 520 may include a continuously or periodically updated list of links to target documents (e.g., third party webpages) that include content preconfigured to allow completion of any actions indicated on the source document (e.g., the webpage currently being visited by the user). As the user moves between webpages, each new webpage may be a new source document that is processed (e.g., using one or more operations of method 300 of FIG. 3) in order to locate new target documents and link the new source document to these target documents via the action completion sidebar 520. In some embodiments, for each new link that is added to the sidebar 520, there may be guide lines or other indicators (e.g., color coding) to associate the link to the one or more entities, words, or word clusters that are most directly associated with the link or otherwise caused the system to select that particular link. For example, in the depicted screenshot 500, the action completion sidebar 520 includes a link 540 to a residential builder recommendation form that can be downloaded from a local chamber of commerce website. Also shown are guide lines 530 and boxes that indicate the words or phrases that caused the system to select the link 540.

Also included in screenshot 500 is a location recommender line 550. In some embodiments, this location recommender line 550 may serve to point out an optimal (or at least appropriate) location within the source webpage 510 to place the link 540. For example, in the depicted instance, the location recommender line 550 points to the words "recommend us", which is also underlined within the passage, to indicate that this is a good location to insert a visible hyperlink in the webpage 510. In some embodiments, this location recommender line 550 may be used in addition to or in place of the action completion side bar 520 and may be useful for aiding a web developer (e.g., content developer) in determining where he should put a visible hyperlink within a webpage that he is developing. Further, in some embodiments, one or more of the natural language processing techniques discussed herein may be used in making this location recommendation to the developer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   determining, based on natural language processing of a passage of a first webpage, that the passage instructs readers of the passage to perform a first action, wherein the first action is of a download type;
   identifying, in response to the determining that the passage instructs readers of the passage to perform the first action, a second webpage, wherein the first webpage and the second webpage are not linked;
   determining, based on natural language processing of the second webpage, that the second webpage is relevant to the passage;
   determining, in response to the determining that the second webpage is relevant to the passage and by analyzing source code of the second webpage, that the second webpage incorporates downloadable content;
   determining, in response to the determining that the second webpage incorporates downloadable content, that the downloadable content is preconfigured to allow completion of the first action; and
   embedding, in response to the determining that the downloadable content is preconfigured to allow the completion of the first action, a hyperlink into the passage, wherein the hyperlink links the first webpage to the second webpage.

2. A system comprising:
   a memory; and
   at least one processor circuit in communication with the memory, wherein the at least one processor circuit is configured to perform a method comprising:
   performing, responsive to a user invoking a transition, via a web browser, from one web page to a desired web page, natural language processing on a passage in content of the desired web page;
   determining, based on the performed natural language processing, that the passage indicates an action to be undertaken and that the passage includes a plurality of significant textual entities;
   comparing, in response to the determination that the passage indicates an action to be undertaken, another passage in content of another web page with the plurality of entities, wherein the another web page is not currently linked to the desired web page within the content of the desired web page;
   determining, based on the comparison, that the another web page is relevant to the passage;
   parsing, in response to the determination that the another webpage is relevant to the passage, source code of the another webpage to determine that the another webpage incorporates downloadable content;
   analyzing, in response to the determination that the another webpage incorporates downloadable content, a file type extension of the downloadable content to determine that the downloadable content is preconfigured to allow completion of the particular action; and
   concurrently displaying, via the web browser and in response to the determination that the downloadable content is preconfigured to allow completion of the particular action, (i) the content of the desired webpage, (ii) an additional sidebar including a listing of a hyperlink to the another web page, (iii) a plurality of visual indicators serving to emphasize an association between the listed another web page and the plurality of entities included in the passage, and (iv) a different visual indicator serving to indicate a recommended location to embed the hyperlink in the passage so as to link the desired web page to the another web page within the content of the desired web page.

3. The system of claim 2, wherein the action is to be undertaken by a reader of the passage, and wherein the content is preconfigured to allow the reader to complete the action.

4. A computer program product comprising a computer readable storage medium having program instructions embodied therewith, the program instructions executable by a computer to cause the computer to perform a method comprising:
   determining, based on natural language processing of a passage of a first webpage, that the passage instructs readers of the passage to perform a first action, wherein the first action is of a download type;
   identifying, in response to the determining that the passage instructs readers of the passage to perform the first action, a second webpage, wherein the first webpage and the second webpage are not linked;
   determining, based on natural language processing of the second webpage, that the second webpage is relevant to the passage;
   determining, in response to the determining that the second webpage is relevant to the passage and by analyzing source code of the second webpage, that the second webpage incorporates downloadable content;
   determining, in response to the determining that the second webpage incorporates downloadable content, that the downloadable content is preconfigured to allow completion of the first action; and
   embedding, in response to the determining that the downloadable content is preconfigured to allow the completion of the first action, a hyperlink into the passage, wherein the hyperlink links the first webpage to the second webpage.

\* \* \* \* \*